United States Patent
Locatelli et al.

(10) Patent No.: US 7,724,735 B2
(45) Date of Patent: May 25, 2010

(54) ON-CHIP BANDWIDTH ALLOCATOR

(75) Inventors: Riccardo Locatelli, Le Fontanil (FR);
Marcello Coppola, Sassenage (FR);
Giuseppe Maruccia, Grenoble (FR);
Lorenzo Pieralisi, Seyssins (FR)

(73) Assignee: STMicroelectronics SA, Montrouge (FR)

( * ) Notice: Subject to any disclaimer, the term of this patent is extended or adjusted under 35 U.S.C. 154(b) by 337 days.

(21) Appl. No.: 11/805,856

(22) Filed: May 24, 2007

(65) Prior Publication Data

US 2007/0274331 A1 Nov. 29, 2007

(30) Foreign Application Priority Data

May 29, 2006 (EP) ................ 06 290 854

(51) Int. Cl.
*H04L 12/56* (2006.01)
*H04J 1/16* (2006.01)
(52) U.S. Cl. .................. 370/389; 370/252; 370/419
(58) Field of Classification Search ............ 370/252, 370/238, 239, 254, 389, 419, 461, 462
See application file for complete search history.

(56) References Cited

U.S. PATENT DOCUMENTS

| | | | |
|---|---|---|---|
| 6,680,955 B1 * | 1/2004 | Le ................ | 370/477 |
| 2004/0001502 A1 | 1/2004 | Garmire et al. | |
| 2004/0210695 A1 | 10/2004 | Weber et al. | |
| 2004/0218606 A1 * | 11/2004 | Leatherbury et al. ..... | 370/395.5 |
| 2005/0125581 A1 | 6/2005 | Brown et al. | |
| 2007/0038793 A1 * | 2/2007 | Wehage et al. ............ | 710/305 |

FOREIGN PATENT DOCUMENTS

| | | |
|---|---|---|
| EP | 0 734 195 A2 | 9/1996 |
| EP | 0 886 455 A1 | 12/1998 |
| WO | WO 2006/089560 A1 | 8/2006 |

OTHER PUBLICATIONS

Evgeny Bolotin et al., "QNoC: QoS architecture and design process for network on chip," Journal of Systems Architecture, vol. 50, Feb. 2004, pp. 105-128.
Evgeny Bolotin et al., "Automatic Hardware-Efficient SoC Integration by QoS Network on Chip," IEEE 2004, pp. 479-482.

(Continued)

*Primary Examiner*—John Pezzlo

(57) ABSTRACT

A bandwidth allocator to allocate in real time shared resources of a network on-chip is disclosed. The bandwidth allocator routes data packets between elements of the network in response to requests to access the shared resources. The bandwidth allocator could include a plurality of network interfaces to process the data packets to be routed within the network and a plurality of routers for routing the data packets through the network. A processor, distributed within the routers, controls the routers and the transmission of each data of the data packets through the routers to provide a bandwidth for each data flow. The network interfaces is adapted to fill a header field of each data packet with header field information depending on a requested bandwidth. The processor controls the transmission of the data packets through the routers as a function of the value of the header field information of each data packet.

18 Claims, 2 Drawing Sheets

OTHER PUBLICATIONS

A. Bystrov et al., "Priority Arbiters," Advanced Research in Asynchronous Circuits and Systems, Apr. 2, 2000 IEEE, pp. 128-137.

Tobias Bjerregaard et al., "Virtual Channel Designs for Guaranteeing Bandwidth in Asynchronous Network-on-Chip," 2004 IEEE, pp. 269-271.

Tomaz Felicijan et al., "An Asynchronous Low Latency Arbiter for Quality of Service (QoS) Applications," ICM Dec. 9-11, 2003, Cairo, Egypt, pp. 123-125.

Axel Jantsch, "Communication Performance in Network-on-Chips," Royal Institute of Technology, Nov. 2003, pp. 1-114.

* cited by examiner

ON-CHIP BANDWIDTH ALLOCATOR

CROSS-REFERENCE TO RELATED APPLICATIONS

The present application is related to European Patent Application No. 06 290 854.6, filed May 29, 2006, entitled "ON-CHIP BANDWIDTH ALLOCATOR". European Patent Application No. 06 290 854.6 is assigned to the assignee of the present application and is hereby incorporated by reference into the present disclosure as if fully set forth herein. The present application hereby claims priority under 35 U.S.C. §119(a) to European Patent Application No. 06 290 854.6.

TECHNICAL FIELD

The present disclosure relates in general to packet forwarding operations in on-chip communication networks and, in particular, to a bandwidth allocator for allocating in real-time shared resources of an on-chip network for routing data packets between elements of the network, such as a calculating means and a memory means.

BACKGROUND

An on-chip network, or Network on Chip (NoC) is based on packet-based communication and relies on a layered definition of the communication. NoCs generally replace buses which tend to be limited in terms of scalability, wire efficiency and performance.

Different fundamental approaches may be followed when building a network core for routing data. Networks based on reservation of connections imply arrangements which are rather complicated and are not appropriate for allocating resources within a low cost arrangement. On the other hand, in packet switched networks, the resources are not reserved. Packets use the resources on demand, and as a consequence, may have not to wait for access to communication link.

Conventional methods and apparatuses for controlling data routing use an arbitration logic. A conventional arbitration controller typically includes a plurality of inputs that receive one or more transactions from a plurality of resources. For example, a conventional arbitration controller typically arbitrates requests for access to shared resources among the plurality of blocks of functionality by implementing an arbitration policy for allowing data packets to be transferred with a requested quality of service (QoS), in particular a requested bandwidth. Accordingly, the arbitration logic is based on sorting the priority bits written in the data packets to be transferred. Accordingly, the shared resources are allocated to the packets according to the value of the priority bit.

Most conventional systems are used to transfer data on bus architectures and are not intended for allocating shared resources in a NOC. In addition, conventional communication systems, the value of the priority bit is allocated to data flow only when the priority is to be changed. Groups of packets are identified by tagging the beginning and/or the end.

In other words, all data having the same level of priority are not tagged with the information bit. Thus, problems may arise when bits of data flows previously sprayed in the network have to be gathered together. Moreover, each time more flows are concentrated, the tagging must follow composition rules not trivial to implement.

In addition, with conventional resource allocation methods, it is not possible to use any kind of arbitration method, such as WRR ("Weighted Round Robin") or priority or other possible schemes.

There is therefore a need for a bandwidth allocator for allocating in real-time shared resources in an on-chip network of a simple architecture, and in which any kind of allocating strategies may be used.

SUMMARY

The present disclosure provides a real-time bandwidth allocator for allocating shared resources of a network on-chip (NOC). The bandwidth allocator routes data packets between elements of the network in response to requests for accessing the shared resources.

In one embodiment, the present disclosure provides a real-time bandwidth allocator to allocate time-shared resources of a network on-chip (NOC). The allocator includes a network interface to process data packets to be routed within the network. The network interface also populates a header field of at least one of the data packets with header field information depending on a requested bandwidth. The allocator could also include routers to route the packets through the network and a processor to control the routers. The processor could also control the transmission of data within each of the data packets through the routers according to a function of a value of the header field information of each data packet.

In another embodiment, the present disclosure provides a method of allocating shared resources of a network on-chip in real time. The method could include populating a header field of data packets with header field information depending on a requested bandwidth. The method could also include controlling transmission of the data packets through routers as a function of the value of the header field information of each data packet.

In still another embodiment, the present disclosure provides a bandwidth allocator to allocate in real time shared resources of a network on-chip. The bandwidth allocator routes data packets between elements of the network in response to requests to access the shared resources. The bandwidth allocator could include a plurality of network interfaces to process the data packets to be routed within the network. The bandwidth allocator could also include a plurality of routers for routing the data packets through the network. The bandwidth allocator could further include a processor distributed within the routers to control the routers and the transmission of each data of the data packets through the routers to provide a bandwidth for each data flow. The network interfaces is adapted to fill a header field of each data packet with header field information depending on a requested bandwidth. The processor controls the transmission of the data packets through the routers as a function of the value of the header field information of each data packet.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
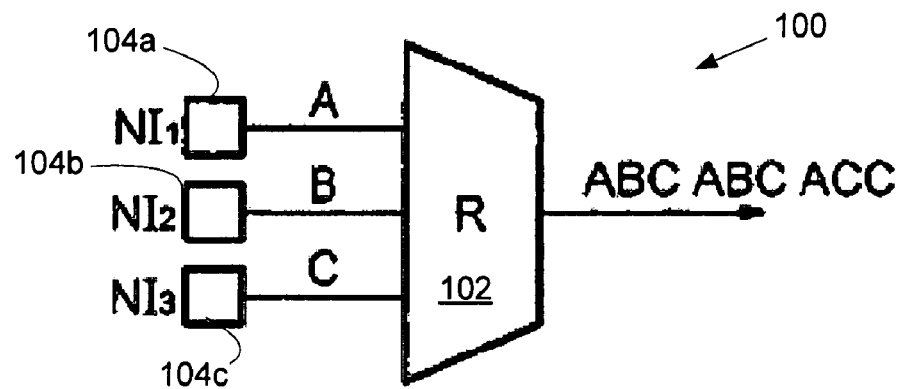
FIG. 1 is a somewhat simplified schematic of a routing strategy for data packets according to one embodiment of the present disclosure.
Figure 2:
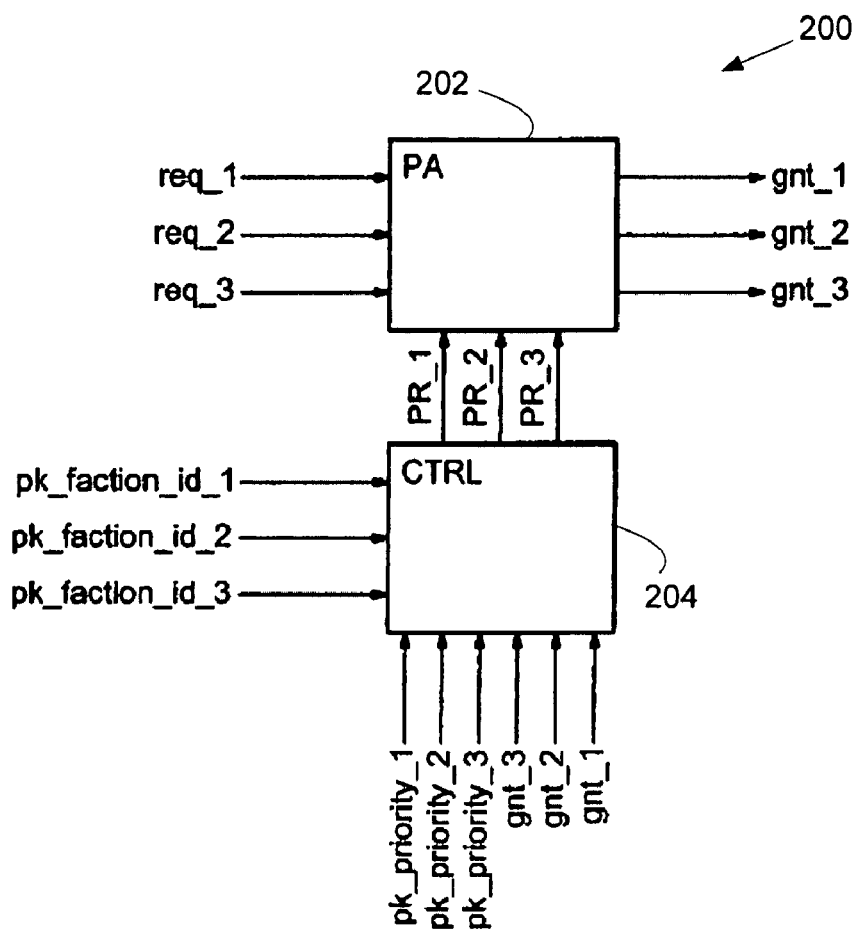
FIG. 2 is a block diagram of a routing means according to one embodiment of the present disclosure.

Reference will now be made to FIGS. 1 and 2 which illustrate a bandwidth allocator according to the invention. One embodiment of the allocator is intended to provide a flexible, scalable and low cost management for allocating variable bandwidth for data packets to be routed within an on-chip network.

FIG. 1 is a somewhat simplified illustration of network 100. Network 100 includes a set of routers (R) 102 connected to respective network interfaces (NI1, NI2 and NI3) 104a, 104b and 104c (sometimes collectively referred to herein as network interfaces 104) in which data packets to be transferred are entered. In the embodiment shown in FIG. 1, the network of routers (R) 102 receives packets of data from the network interfaces ($NI_1$, $NI_2$ and $NI_3$) 104. Access to shared resources is controlled by arbitration means 200 included in each router 102 as shown in FIG. 2.

More particularly, within each router 102 output links are shared resources. Arbitration means 200, depicted in FIG. 2, included in each router 102 arbitrates the resources such that data packets from the network interfaces ($NI_1$, $NI_2$ or $NI_3$) 104 are arbitrated through the routers 102 they are going to cross accordingly to priority policy.

Each packet, denoted A, B or C, is associated with a weighting factor, for example 3, 2 or 4 such that, after routed by a corresponding router, the data packets are transmitted according to the value of the weighting factor. For example, if data packets A, B and C are allocated with weighting factors 3, 2, 4 respectively, the transmitted word of packets will be, in one embodiment, ABC ABC ACC. But the sequence can be different in another embodiment depending on the arbitration scheme used within the word of packets, for instance AAA BB CCCC.

As illustrated in FIG. 2, arbitration means 200 of each router 102 are used to grant or not access to the shared resources for each request (req-1, req-2 or req-3), to access said resource, by setting the value of a grant signal (gnt-1, gnt-2 or gnt-3) associated with each request input.

As also illustrated, arbitration means 200 of each router 102 comprises a priority arbiter (PA) 202 intended to grant or not access to the shared resources and an arbitration controller (CTRL) 204 which elaborates and allocates priority values to each data packet entered to the router 102, with a view to schedule transmission of each data packet to allow a higher priority (PR-1, PR-2 or PR-3) to one of the request (req-1, req-2 or req-3) to access shared resources of the network 100 inputted in the router 102.

The execution strategy is based on the use of priority information introduced within the header filled of injected packets. In particular, the network interfaces (NI1, NI2 and NI3) 104 are provided with means and are dully programmed for filling the header QoS field for each injected packet with the following bits: PK-faction-id, PK-priority and PK-priority-FBA.

The header field information, PK-faction-id, corresponds to the priority information associated to each packet and, for example, may have two values, namely "one" or "zero".

The packet priority information, PK-priority, is the priority specified for each packet within a set of packets having the same PK-faction-id and is used, in one embodiment of the present disclosure, to allocate particular priority to each of these packets having a same header field information.

The third information value, PK-priority-FBA, is written in each header field and is used to allocate priority for each data packet not transferred or, in other words, to the least recently served packets.

This information is entered within the arbitration controller (CTRL) 204 to schedule priority and allocate the shared resources (FIG. 2).

Accordingly, as illustrated in FIG. 2, when each data packet is entered within the on-chip network, the packets are first tagged with the information PK-faction-id-1, PK-faction-id-2 or PK-faction-id-3 depending on a requested bandwidth and the packets from different sources are transferred, at each router of the network R, such that packets having the same priority information PK-faction-id-i are grouped to move together.

For example, the header field information PK-faction-id-i and the third information value PK-priority-FBA-i are to prioritize packets least served and are coded using one bit, whereas the packet priority information PK-priority-i is coded using two bits. However, this packet priority information may be coded, if needed, using a different number of bits (n) greater than 2.

It should be noted that a requested bandwidth is expressed in bytes and corresponds to the global amount of data transferred, computed from the opcode size, by a considered one network interface in a given round during which the packets are transferred using a same information PK-faction-id, at a specific target.

The round at the specific target is a given number of variable accesses. The size of bytes read or written in that round represents the percentage of variable bandwidth demanded by this initiator flow.

As previously indicated, the priority information PK-faction-id-i may have two values, namely one or zero, depending on the requested bandwidth for reaching a specific target.

In addition, the data packets that have to be transferred together are tagged by the same PK-faction-id-i. For that purpose, each network interface (NIi) 104 accumulates the opcode size associated to each packet and tags with the same priority information all the packets until the threshold value is reached. Then, the priority information is switched, and the data transfer size is once again accumulated until the threshold is reached again. In one embodiment, the threshold can be fixed and in another embodiment it can vary dynamically with specific hardware of software means to control its value. Accordingly, the arbitration controller (CTRL) 104 gives high priority (PR-i) to packets which have the same header field information. The thus labeled data packets are transferred first.

The data packets having the same priority information PK-faction-id, the arbitration controller (CTRL) 204 may, as indicated above, use a known arbitration strategy, for example, of the type RR ("Round Robin"), WRR ("Weighted Round Robin") or LRU ("Least Recently used"). However, it should be understood that any other suitable strategies may also be used.

According to another embodiment, specific priority may be allocated to each data packet having a same priority information PK-faction-id-i using the packet priority information PK-priority-1, PK-priority-2 or PK-priority-3 such that the router 102 transfers first the data packets having the higher packet priority information.

As previously indicated, the data packets are transferred by the routers 102 according to the value of the priority information. In particular, the arbitration controller (CTRL) 204 stores, within a register, the current value of the priority information PK-faction-id of transferred data packets.

For that purpose, the header field information included within the QoS header of each incident packet is compared with the current value stored within the register. When the value of this information corresponds to that of the current information stored within the register, the packet is tagged with a high priority in order to be transferred together with the data packets having the same priority information.

Figure 3:
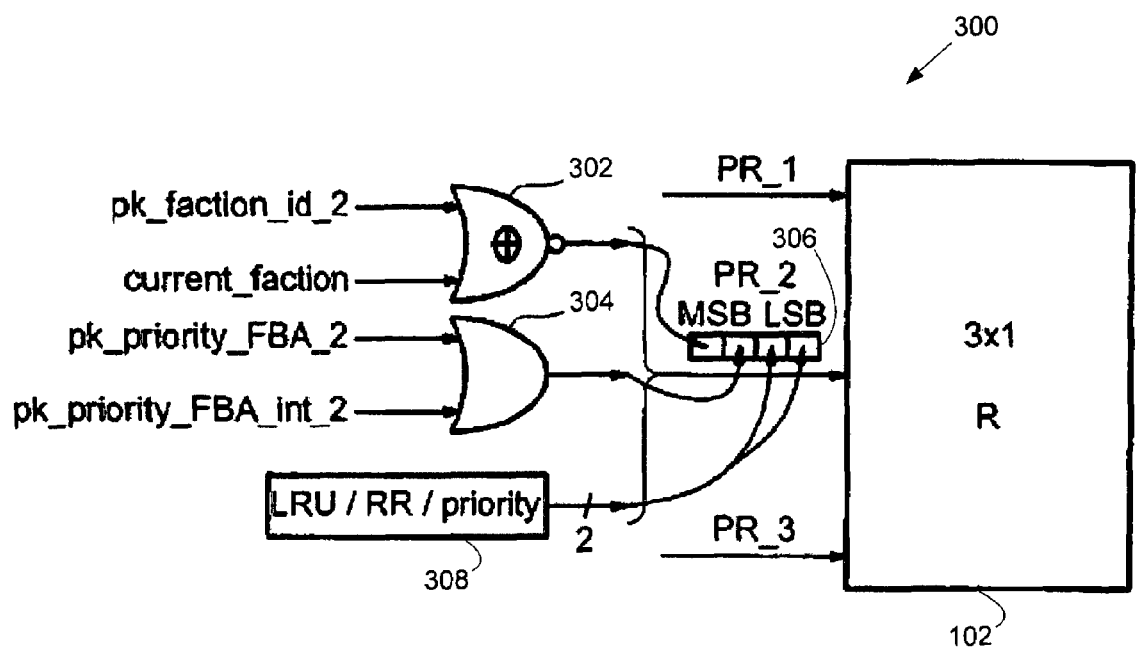
FIG. 3 is a somewhat simplified block diagram of a routing means and, in particular, of the arbitration controller to elaborate the priority value according to one embodiment of the present disclosure.

As illustrated by FIG. 3, the arbitration controller 200 is, for that purpose, realized using a simple logic circuitry 300. For example, in one embodiment, this logic circuitry 300 comprises a first logic gate 302 realizing the logical function "NOT (XOR)" between the header field information PK-faction-id-i and the current header field information. A second logical gate 304 realizes the logical function "OR" between the third information allocating for each data packet not transferred a priority PK-priority-FBA-i, locally tagged or previously written at a previously reached router and a corresponding information PK-priority-FBA-int-i computed internally by the arbitration controller associated with a present router 102.

Finally, another priority information is elaborated using the PK-priority data. Otherwise, as previously indicated, a conventional arbitration strategy block 306 may be used to elaborate priority information for data packets having the same header field information.

Each information provided by the logical elements 302 and 304 or by the block 306 are used to elaborate a priority word the most significant bit (MSB) of which corresponds to the output of the first logical gate 302, whereas the two least significant bits (LSB) correspond to the priority information provided by the third block 306.

Accordingly, the most significant bit MSB is set to one when the priority information provided by a logical gate 302 is equal to the corresponding information stored within the register of the arbitration controller. This means that the current packet belongs to the current information value and must have highest priority.

The two least significant bits correspond to the field of the packet header previously called PK-priority or is generated by the RR or WRR logic or by the LRU logic in block 308.

Finally, the bit issued by the second logical block 304 is used to set a high or a low priority to packets that have not been transferred or that have been transferred in a previous round. This reduces latency because flows that miss a round will be prioritized in the following round. This bit can be constituted by a value reported in the header or computed internally by the arbitration controller unit (CTL) 204 as result of the last round local to this router.

The information PK-priority-FBA-int is updated when the priority information changes. In such a case, this data PK-priority-FBA-int is set for each input not served in previous rounds and is copied within the header of each packet arising from the same entry.

Finally, as concerns the current priority information stored within the register of the arbitration controller, this value is maintained when an incident packet has the same information data value or when no packet arrives. On the contrary, this value is changed when there is no packet having this priority information value. For that purpose, bits of the header PK-faction-id, which are allowed to pass, are simply sampled to determine the value of the internal priority value.

It should at last be noted that there are numerous benefits of the bandwidth allocator according to the present disclosure. For example, the bandwidth allocator is only requested to program the network interface with the requested bandwidth value. In addition, the routers have no register to be programmed and thus their behavior is fixed.

Furthermore, the quality of service (QoS) is not explicitly linked to the path of flow through the routers, but only to the injection point, namely the network interface. For instance, routing can be changed without any effort to re-compute the path followed by the flow and the consequent QoS parameters along this new path. One embodiment of the present disclosure is good to support hierarchical multi-hop distributed interconnected such as the network on chip.

Another benefit of one embodiment of the present disclosure is that bandwidth can be proportionally allocated, but flows can be prioritized in a round using any available standard arbitration scheme or a per-packet priority scheme. Least recently used packets can be automatically and dynamically prioritized through the entire network to limit maximum latency. Finally, the router implements a simple arbiter, without any need of counter or slow complex logic.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A real-time bandwidth allocator to allocate time-shared resources of a network on-chip (NOC), the allocator comprising:
   a network interface to process data packets to be routed within the network and to populate a header field of at least one of the data packets with header field information depending on a requested bandwidth;
   routers to route the packets through the network; and
   a processor to control the routers and the transmission of data within each of the data packets through the routers according to a function of a value of the header field information of each data packet,
   wherein the data having a same header field information value are grouped together to be transferred together through a router.

2. The allocator of claim 1, wherein the processor controls the transfer of the data admitted in parallel in each of the routers.

3. The allocator of claim 1 further comprising:
   an arbitration controller to control the routers according to a priority value associated with each of the data packets.

4. The allocator of claim 3, wherein the processor stores a current header field information value and compares the current information value with the information value stored in the header of each incoming data packet.

5. The allocator of claim 1 further comprising:
a circuit to control the transfer of data packets having a same header field information value.

6. The allocator of claim 5, wherein the network interface is adapted to fill the header field of each data packet with a packet priority information, and
wherein the processor comprises an arbitration controller adapted to control transfer of data according to the value of the packet priority information.

7. The allocator of claim 6, wherein the processor comprises an arbitration controller having scheduler to control transfer of data having a same header field information value, the scheduler comprising at least one of: a WRR scheduler, a RR scheduler, and a LRU scheduler.

8. The allocator of claim 1, wherein the processor prioritizes the least recently transferred data packets.

9. The allocator of claim 8, wherein the processor writes a third information value in each header field of each data packet not transferred.

10. A method of allocating shared resources of a network on-chip in real time, the method comprising:
populating a header field of data packets with a header field information depending on a requested bandwidth;
controlling transmission of the data packets through routers as a function of the value of the header field information of each data packet;
grouping data having the same header field information value together; and
transferring the grouped data together through a router.

11. The method of claim 10 further comprising:
controlling the transmission of the data packets according to a priority value associated with each of the data packets.

12. The method of claim 10 further comprising:
storing a current header field information value associated with each of the data packets; and
comparing the current information value with the information value stored in the header of each incoming data packet.

13. The method of claim 10 further comprising:
sorting the data packets by similar header field information values.

14. The method of claim 13 further comprising:
populating the header field of each data packet with a packet priority information; and
transferring data according to the value of the packet priority information.

15. A bandwidth allocator to allocate in real time shared resources of a network on-chip to route data packets between elements of the network in response to requests to access the shared resources, the bandwidth allocator comprising:
a plurality of network interfaces to process the data packets to be routed within the network;
a plurality of routers for routing the data packets through the network; and
a processor distributed within the routers to control the routers and the transmission of each data of the data packets through the routers to provide a bandwidth for each data flow,
wherein the network interfaces is adapted to fill a header field of each data packet with header field information depending on a requested bandwidth,
wherein the processor controls the transmission of the data packets through the routers as a function of the value of the header field information of each data packet, and
wherein data comprising the same header field information values are grouped together to be transferred together through a router.

16. The allocator of claim 15, wherein the processors is adapted to control transfer data of packets admitted in parallel in each router.

17. The allocator of claim 15, further comprising:
an arbitration controller to control the routers according to a priority value associated with each of the data packets.

18. The allocator of claim 17, wherein the processor stores a current header field information value and compares the current information value with the information value stored in the header of each incoming data packet.

* * * * *